US 6,725,524 B2

(12) United States Patent
Lin et al.

(10) Patent No.: US 6,725,524 B2
(45) Date of Patent: Apr. 27, 2004

(54) ELECTRIC MOTOR BONDING LUG APPARATUS

(75) Inventors: Chih M. Lin, Tipp City, OH (US); William J. Watkins, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/989,043

(22) Filed: Nov. 20, 2001

(65) Prior Publication Data

US 2003/0093892 A1 May 22, 2003

(51) Int. Cl.⁷ .............................................. H02K 15/16
(52) U.S. Cl. ......................................... 29/596; 439/800
(58) Field of Search ..................... 29/596, 525, 525.01, 29/525.11, 525.02; 439/800, 790, 793, 810, 814

(56) References Cited

U.S. PATENT DOCUMENTS

| | | | |
|---|---|---|---|
| 2,070,566 A | | 2/1937 | Dobbs |
| 2,694,800 A | * | 11/1954 | Sunderhauf ................. 439/808 |
| 2,710,381 A | * | 6/1955 | Monson ........................ 439/95 |
| 2,968,018 A | | 1/1961 | Hubbell |
| 3,238,496 A | * | 3/1966 | Crowther .................... 439/782 |
| 3,624,588 A | | 11/1971 | Farmer |
| 3,728,468 A | * | 4/1973 | Grauer ......................... 174/51 |
| 3,786,398 A | | 1/1974 | Snider |
| 4,057,312 A | | 11/1977 | Hagermo |
| 4,722,701 A | | 2/1988 | Bradt |
| 4,913,666 A | | 4/1990 | Murphy |
| 4,917,615 A | * | 4/1990 | Franks, Jr. ................... 439/814 |
| 4,953,285 A | * | 9/1990 | Fisher .......................... 29/596 |
| 4,960,964 A | | 10/1990 | Schnell et al. |
| 5,535,503 A | | 7/1996 | Newman |
| 5,596,237 A | | 1/1997 | Daniels |
| 6,040,646 A | | 3/2000 | Peters |
| 6,142,836 A | | 11/2000 | Deckmann et al. |
| 6,261,040 B1 | * | 7/2001 | Reynolds et al. ........... 411/416 |
| 6,361,382 B1 | * | 3/2002 | Yamada et al. ............. 439/813 |
| 6,388,216 B1 | * | 5/2002 | Puhalla et al. .............. 200/284 |

* cited by examiner

Primary Examiner—Irene Cuda Rosenbaum
Assistant Examiner—Stephen Kenny
(74) Attorney, Agent, or Firm—Michael Best & Friedrich LLP

(57) ABSTRACT

A bonding lug apparatus for devices such as electric motors installed within a distance of a fluid-holding apparatus such as pools, hot tubs, spas, and the like, is provided that includes a fastener having a head and a bonding lug having an aperture that receives the fastener such that a bonding conductor of a bonding grid of the fluid-holding apparatus area is captured between the head of the fastener and the bonding lug. The bonding lug apparatus bonds the electric motor to the bonding grid of the fluid-holding apparatus area when the bonding lug apparatus is electrically coupled to the electric motor and the bonding conductor.

28 Claims, 20 Drawing Sheets

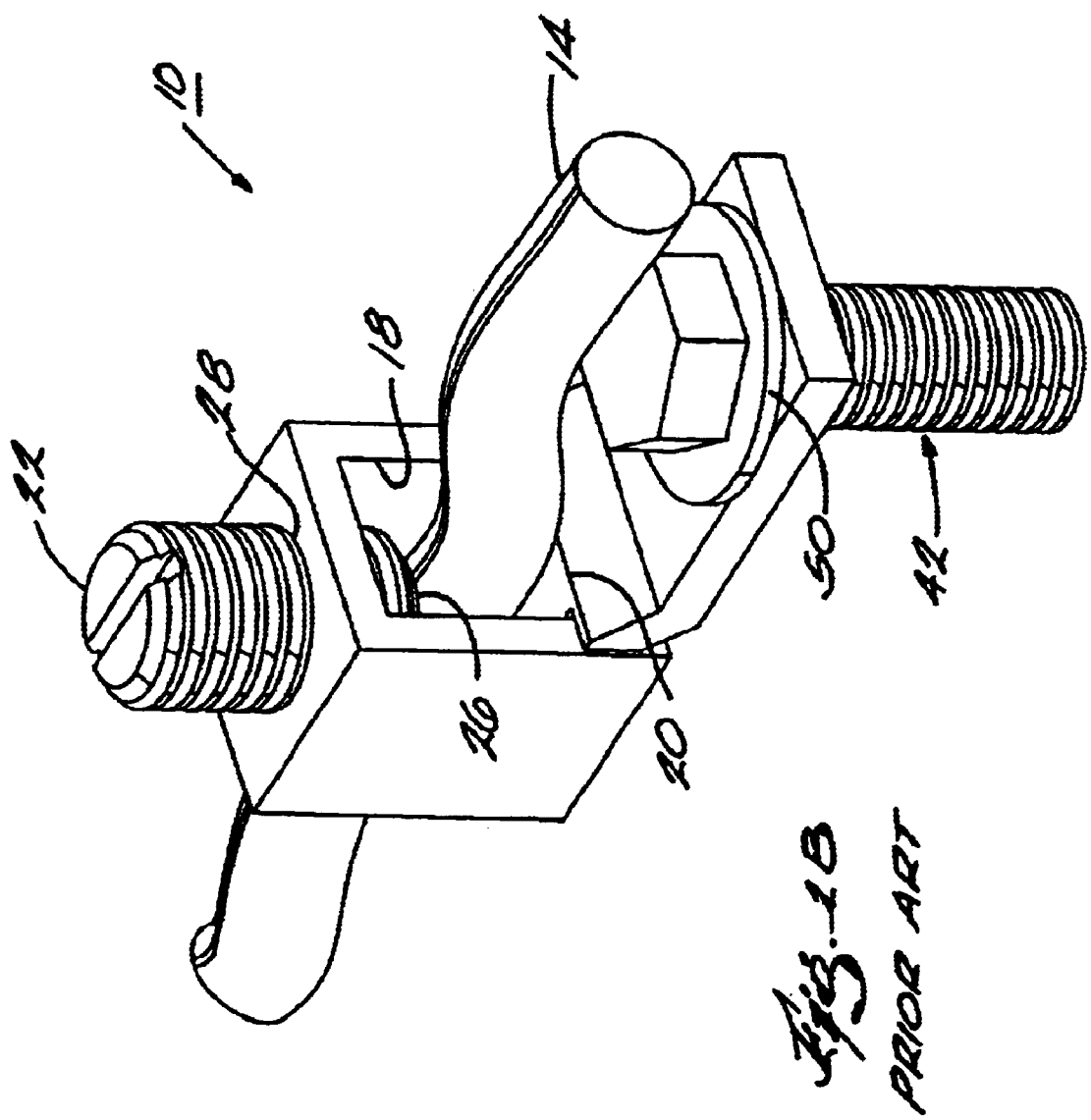

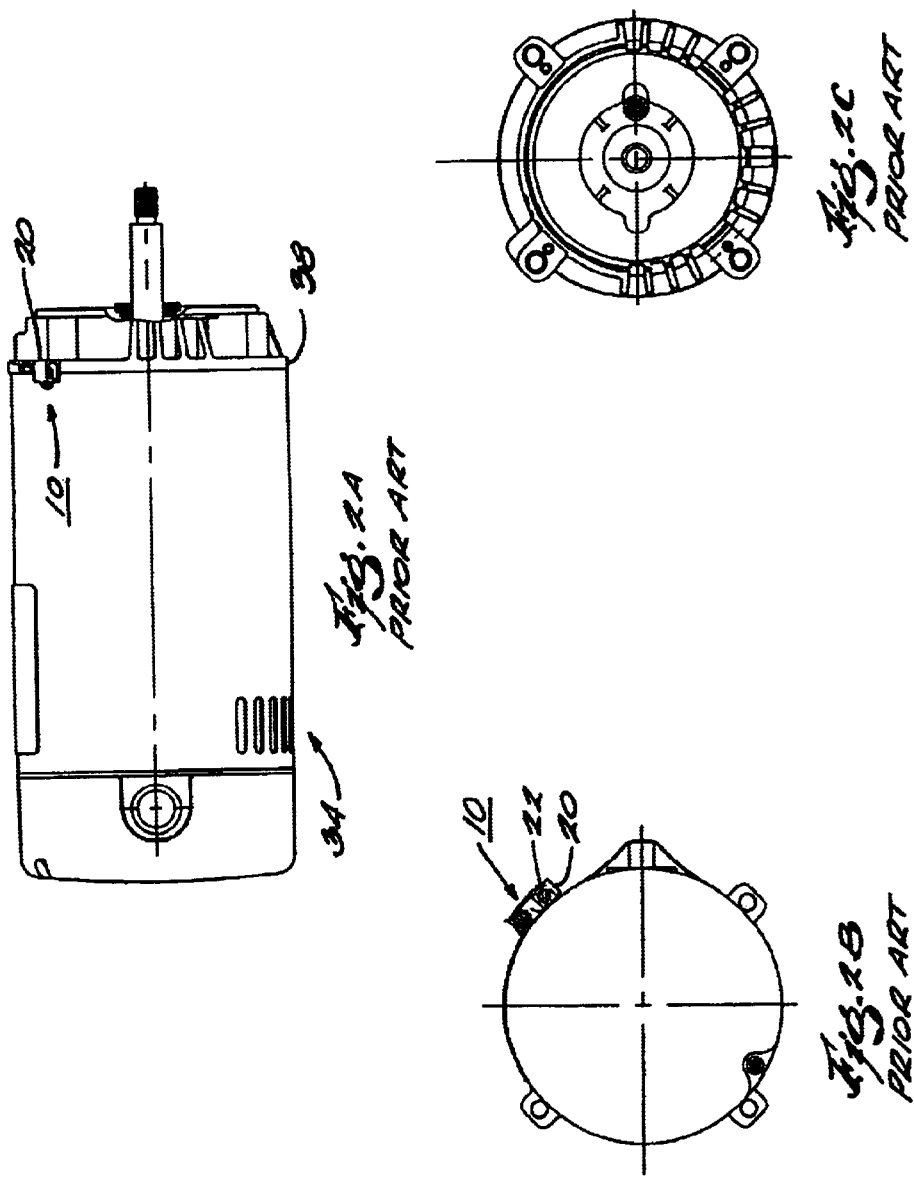

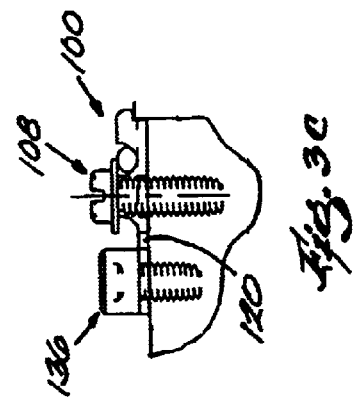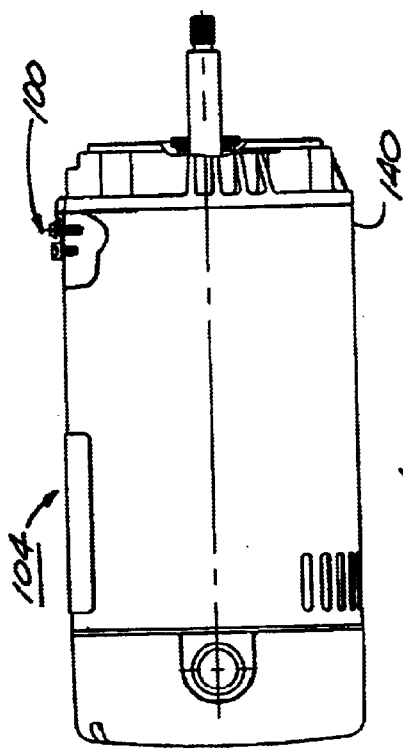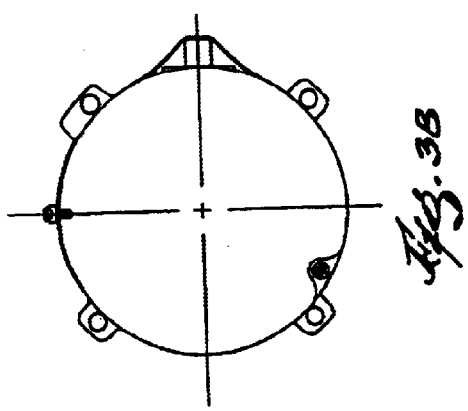

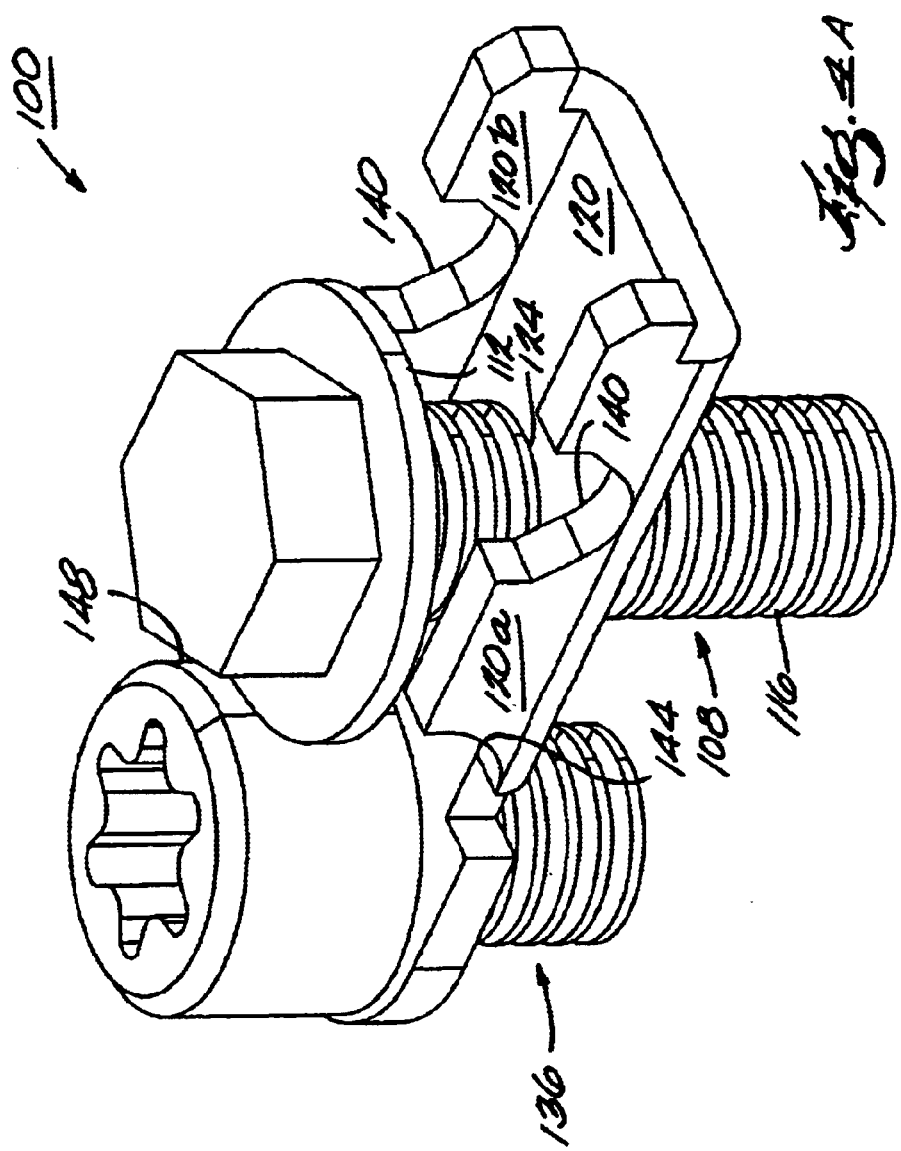

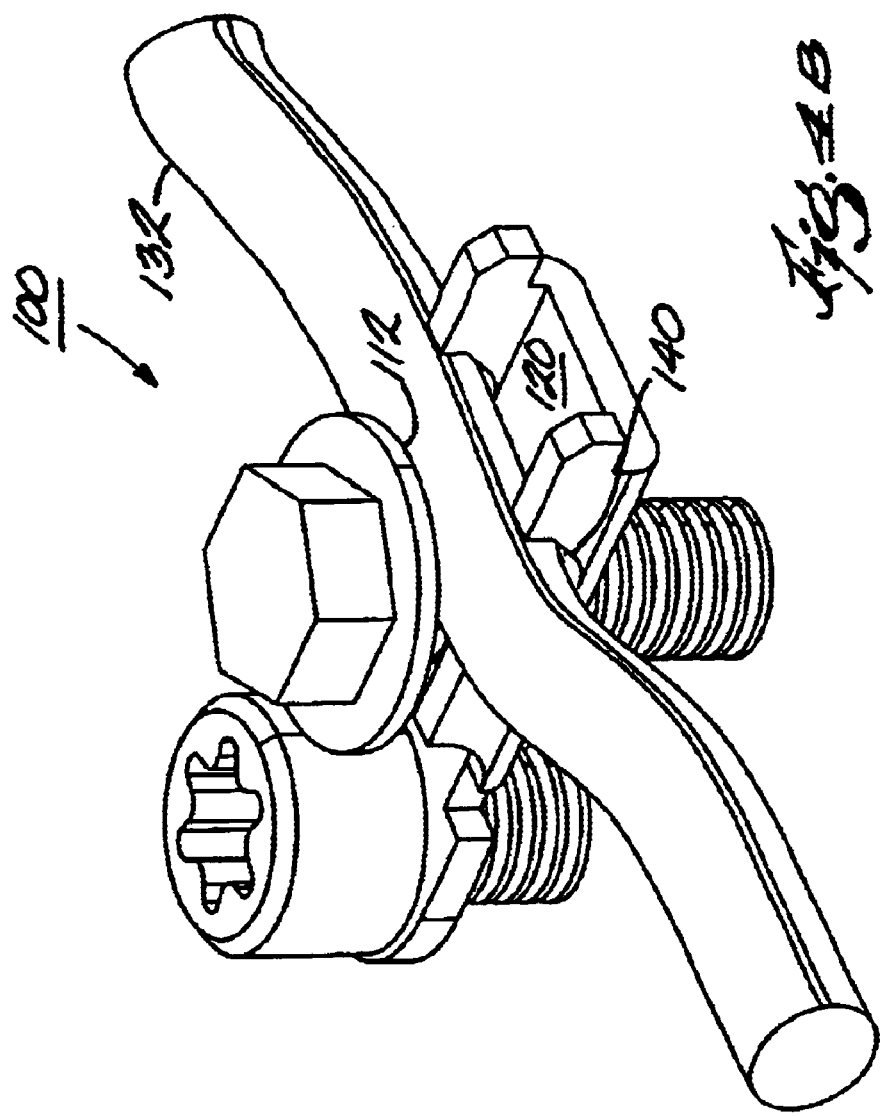

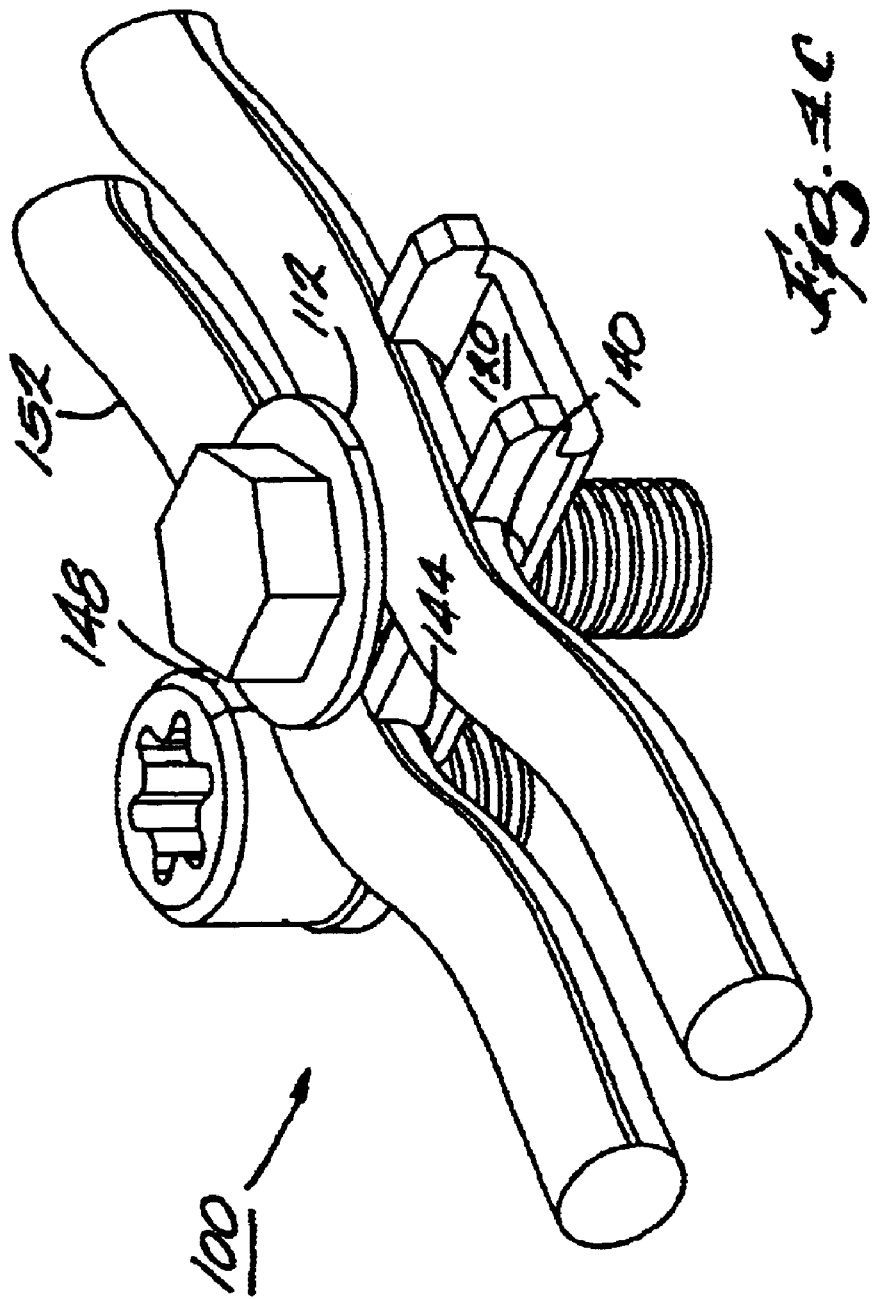

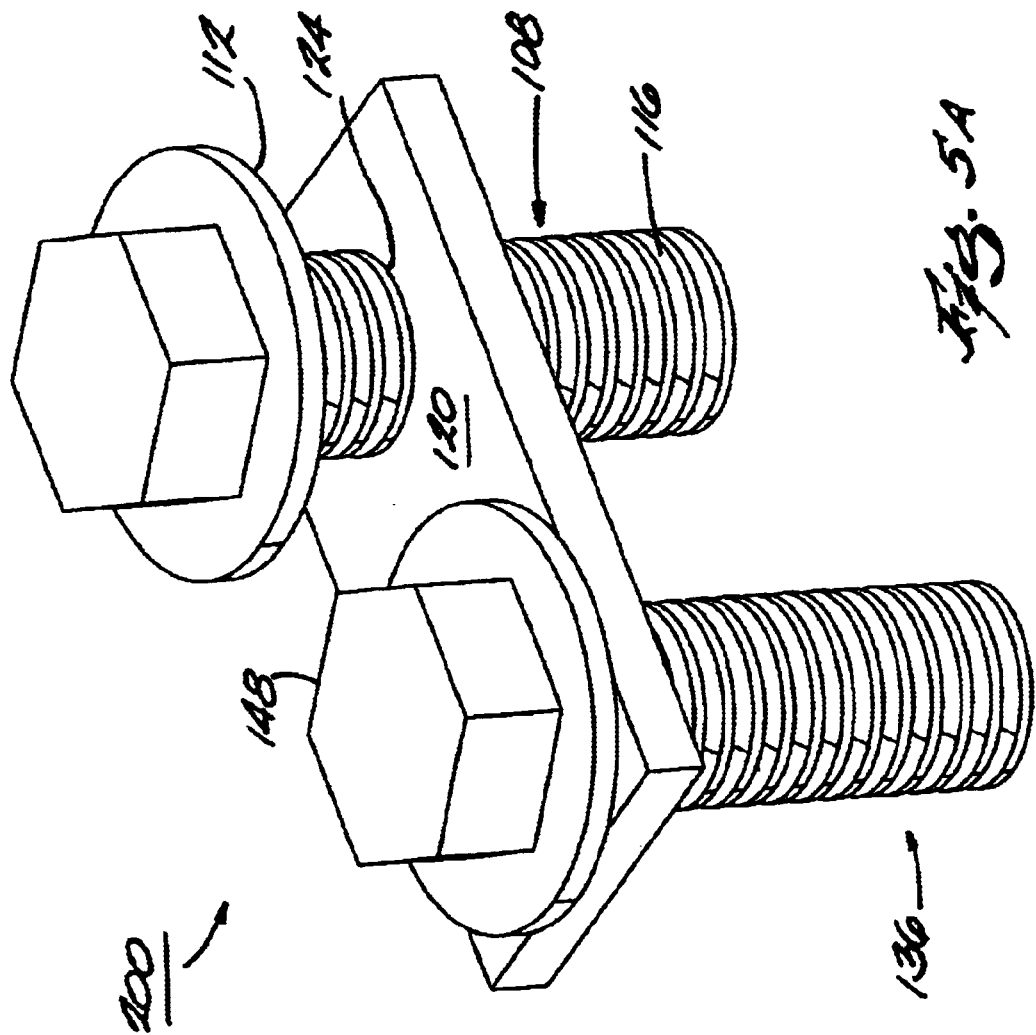

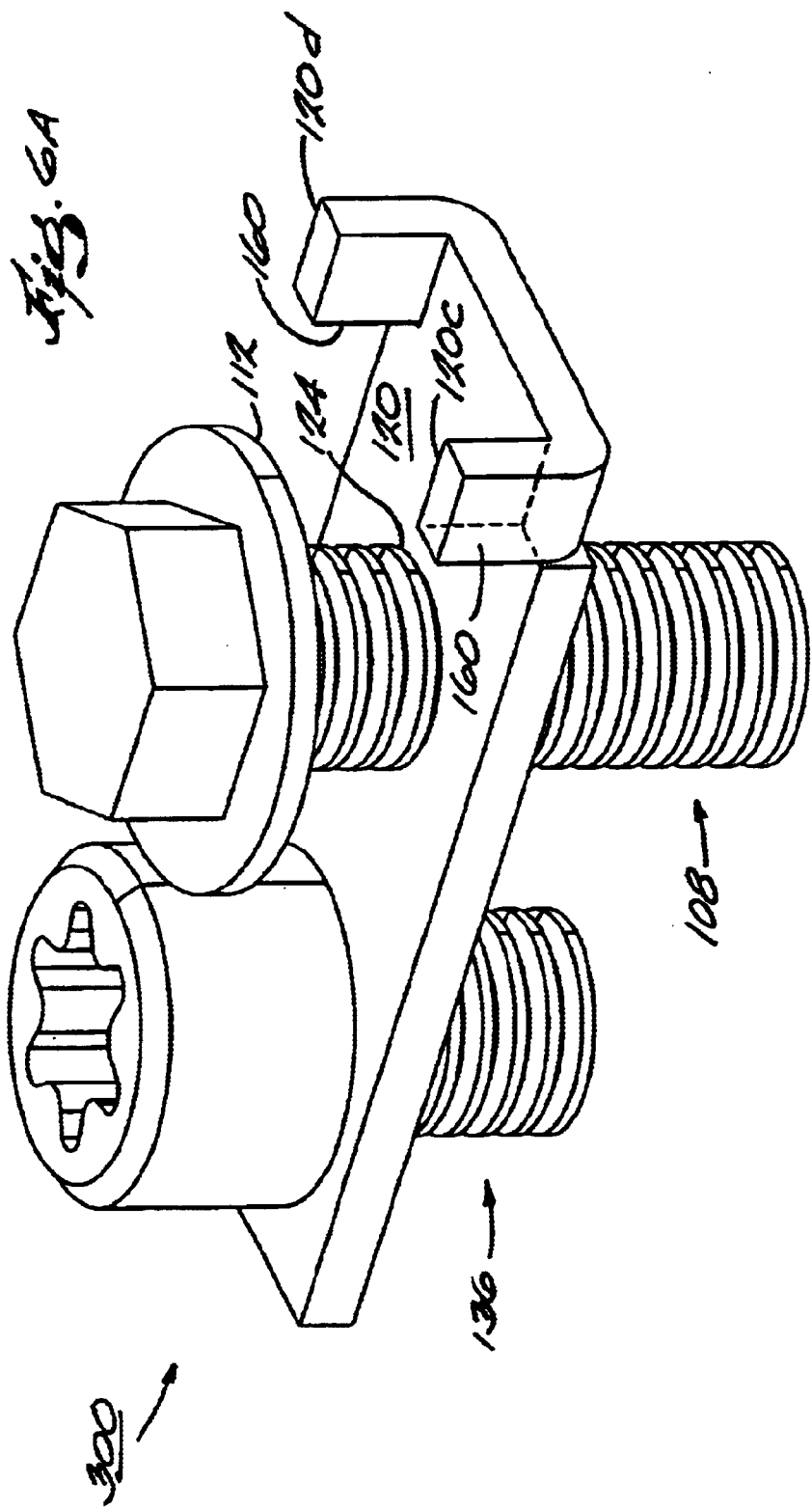

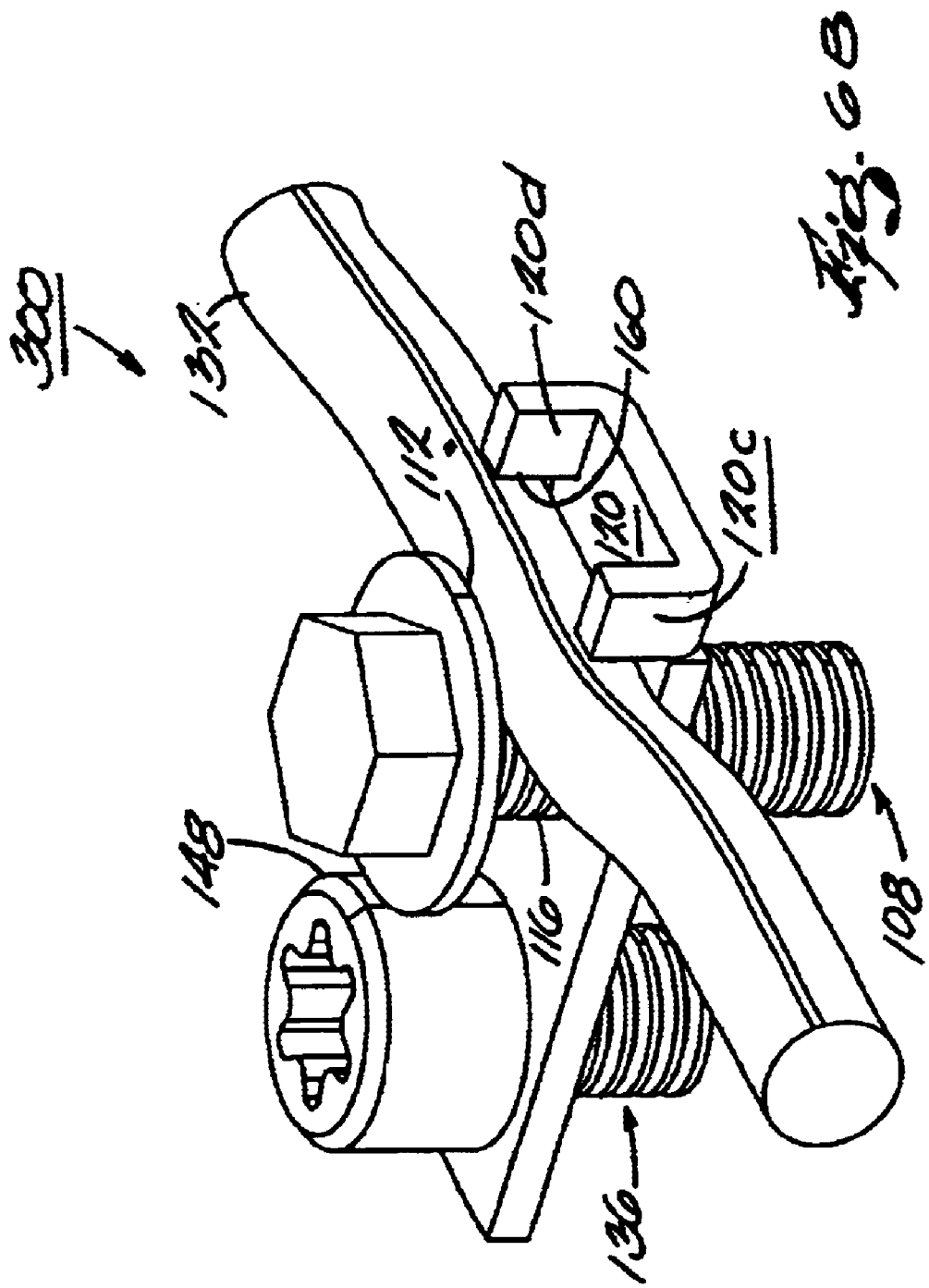

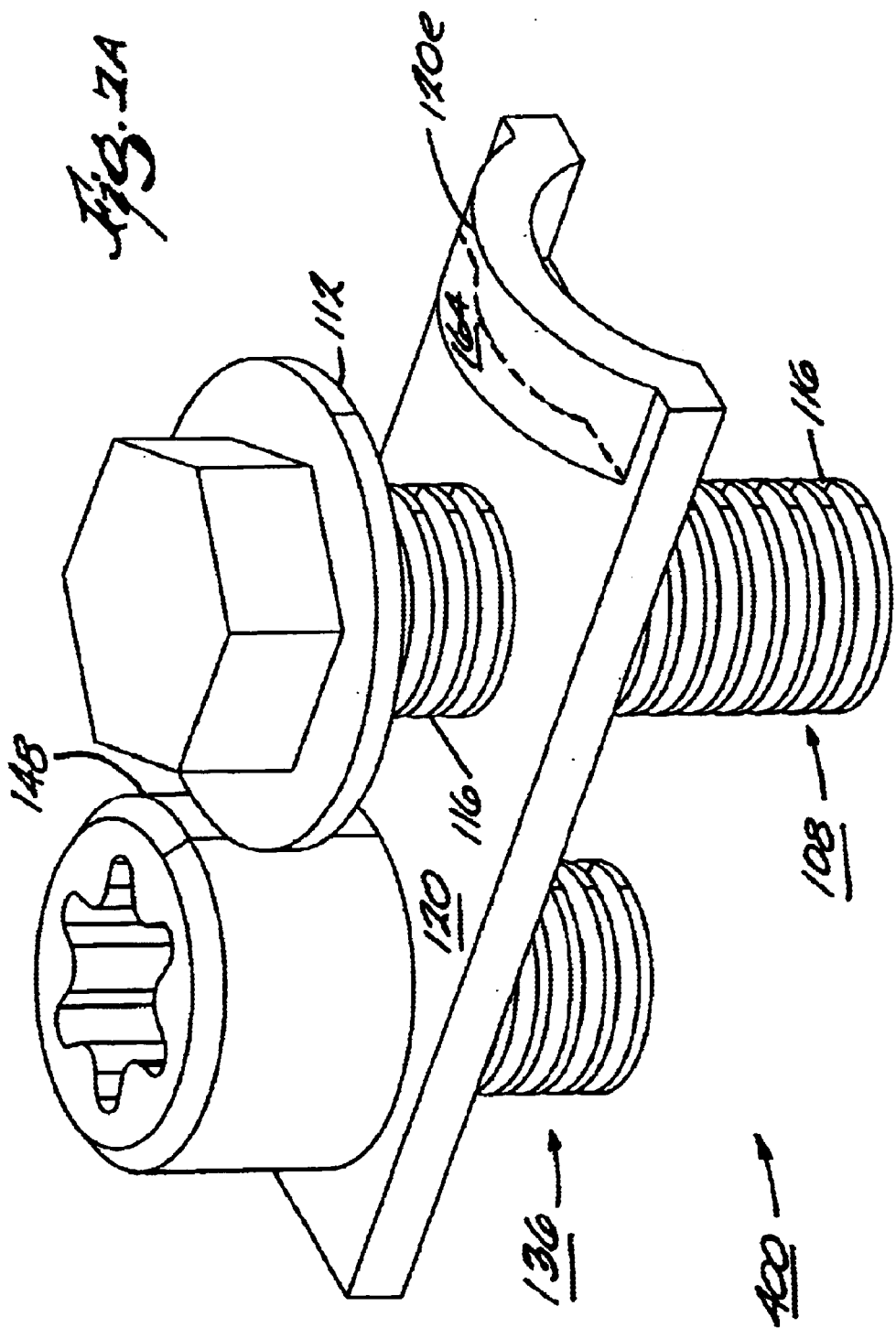

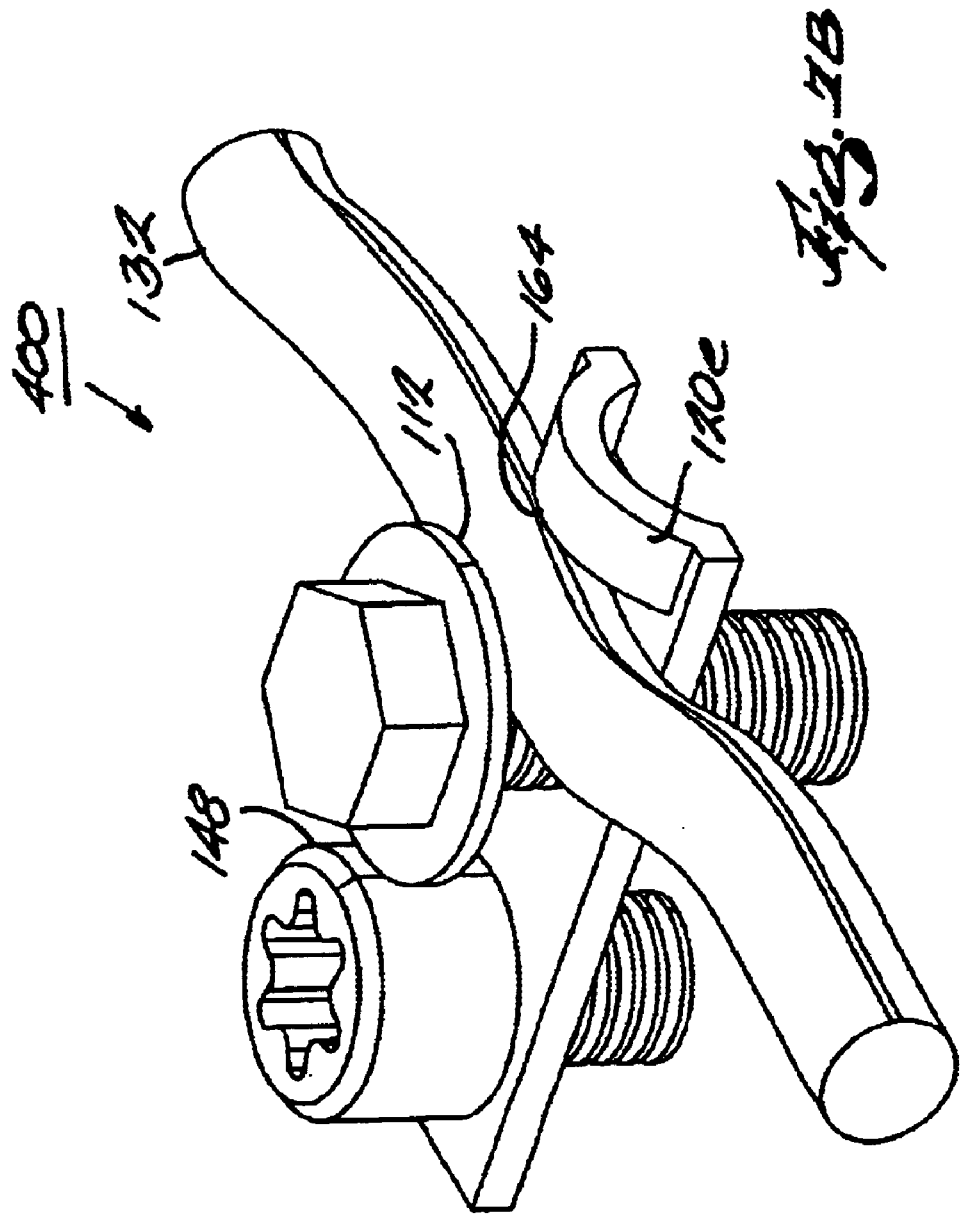

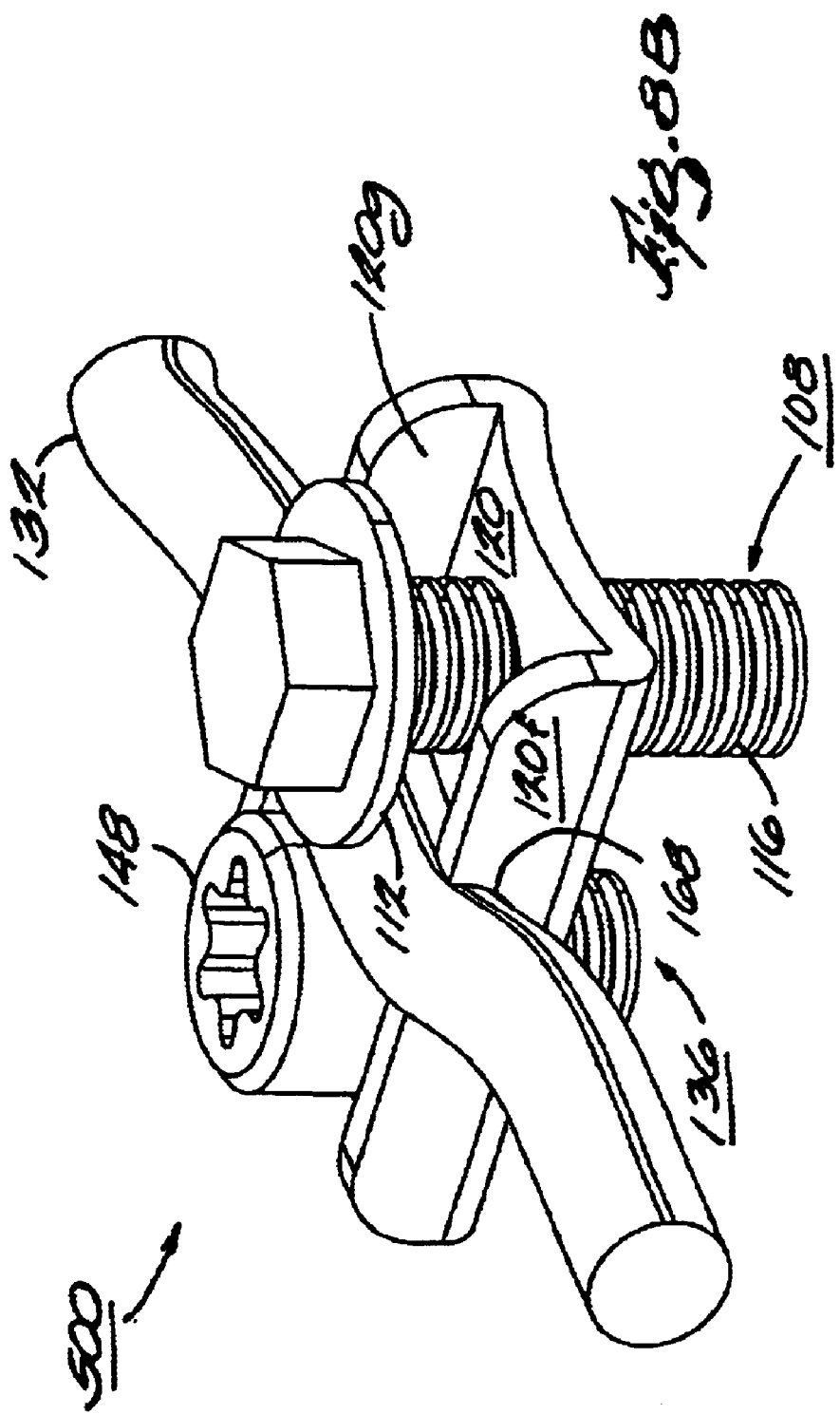

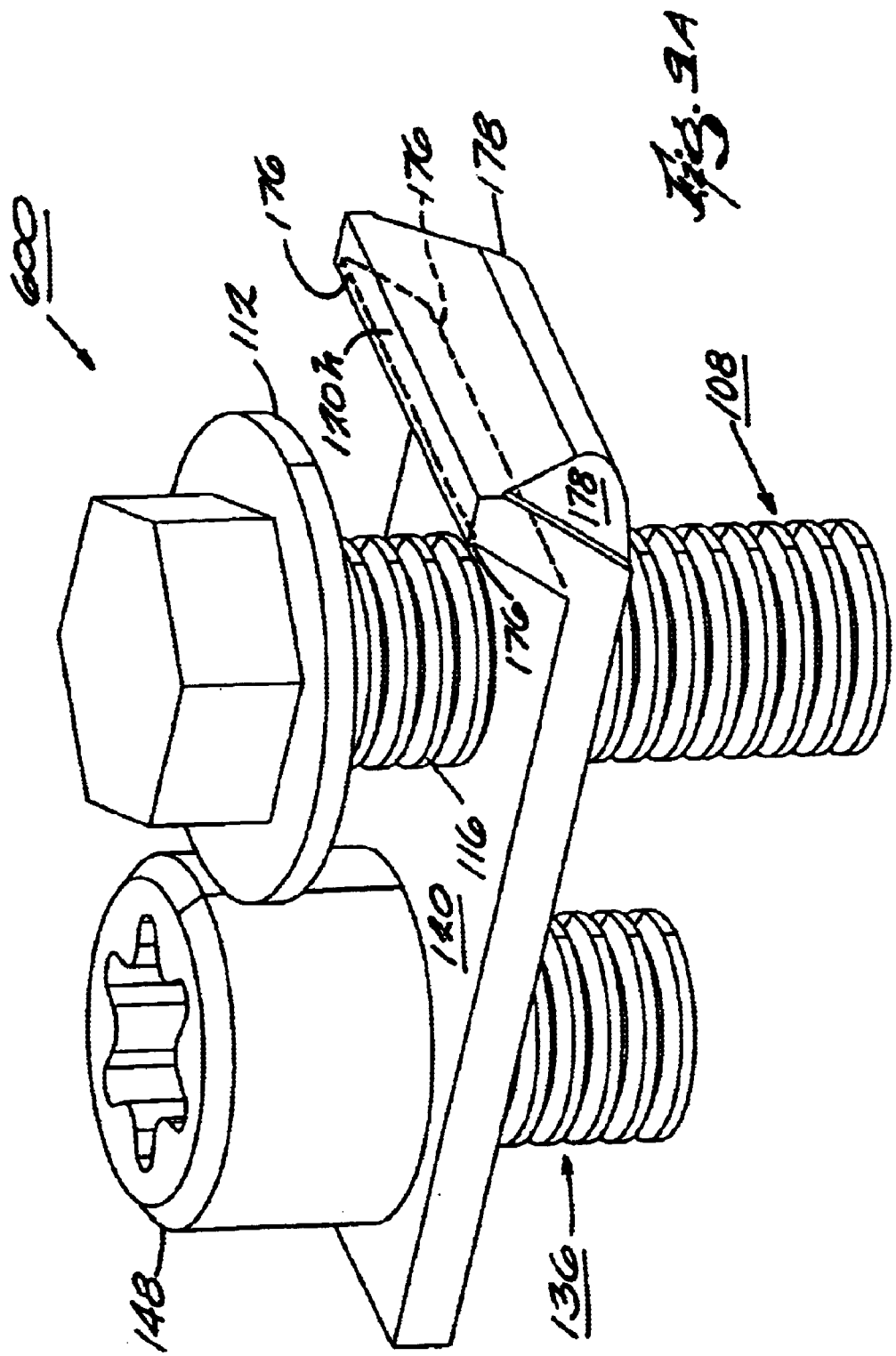

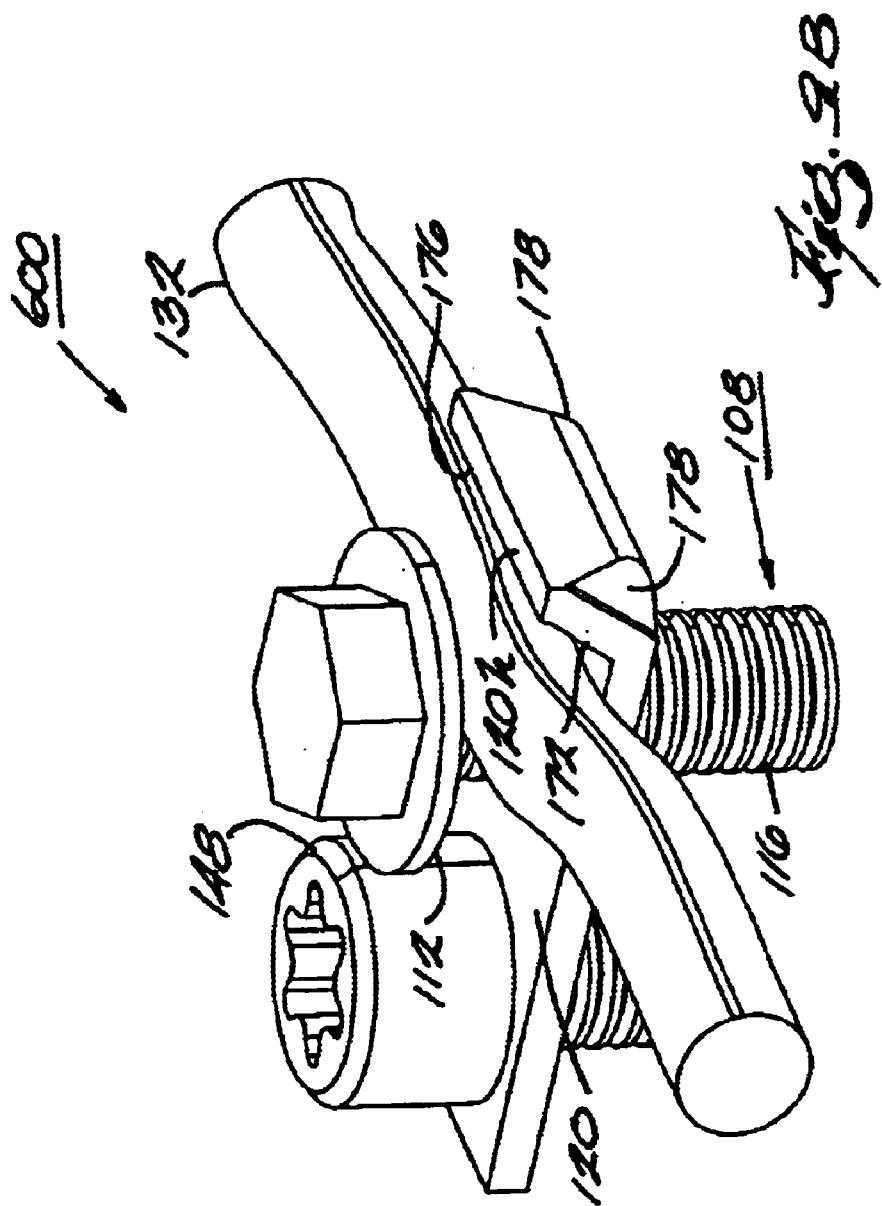

ELECTRIC MOTOR BONDING LUG APPARATUS

BACKGROUND OF THE INVENTION

The present invention relates to electric motors, and more particularly to a bonding lug apparatus for devices such as electric motors installed within a distance of a swimming pool, hot tub, spa, or the like.

Permanent installation of pools and equipment associated with the pools (e.g., pumps, filters, ladders, decking, fencing, lighting, and the like) generally requires compliance with a number of installation standards. The installation standards may include standards such as those provided by National Electric Code ("NEC") (e.g., NEC Article 680/22), Underwriters Laboratories, Inc. ("UL") (e.g., UL Standard 467) and local authorities (e.g., municipal statutes that are often based on the national standards provided by NEC and UL). Standards relating to bonding often require that devices or conductive materials (e.g., metal) located within a distance of the pool (i.e., in the pool area) be bonded together to form a bonding grid of the pool area.

The purpose of forming a bonding grid is to eliminate the potential for an electrical energy differential in the pool area (i.e., shock hazard). The bonding grid acts as a path of less resistance than does the path of resistance provided by a human and/or an animal (e.g., cat or dog) located in the pool area. Any stray electrical energy inside the pool area is therefore conducted through the bonding grid instead of through the human and/or the animal located in the pool area.

The size of the bonding grid often depends on the amount of conductive material located in the pool area. The devices or conductive material in the pool area may include metal parts of the pool structure, metal ladders, metal railings, metal fittings utilized to secure the metal ladders and the metal railings to the pool, metal parts of decking surrounding the pool, metal fencing surrounding the pool, metal parts of electrical equipment, metal forming shells utilized to enclose light fixtures, and the like. A small bonding grid may include only a single bonding conductor that bonds together a limited number of conductive materials located in the pool area. Alternatively, a large bonding grid may include a high number and/or a high volume of conductive materials such as the metal parts of the pool structure bonded to the metal parts of the decking bonded to a bonding conductor that bonds the remaining conductive materials in the pool area to the larger segments of the bonding grid.

Regardless of the size of the bonding grid, the individual installing the pool and the associated equipment must make sure to comply with all applicable standards. These standards typically require bonding of devices such as electric motors located in the pool area (e.g., a pool pump motor) to the bonding grid of the pool area.

Bonding lug apparatus for bonding an electric motor to a bonding grid are generally known. Typically the bonding lug apparatus bonds the electric motor to a bonding conductor which is part of the bonding grid. The bonding conductor includes a solid eight (or larger) gauge bare copper wire. The conductor generally does not require use of insulation or a conduit because the conductor does not carry electrical energy under normal operating conditions (i.e., only utilized when an electrical energy differential is present in the pool area). Existing bonding lug apparatus, such as a bonding lug apparatus 10 illustrated in FIGS. 1A–B and 2A–C, require that a bonding conductor 14 be passed through an aperture 18 in a bonding lug 20 and then bonded to the bonding lug 20 by tightening a threaded fastener or screw 22 down upon the conductor 14 such that the conductor 14 is captured between the bonding lug 20 and the bottom 26 of the screw 22. The screw 22 is threaded into an aperture or opening 28 in the lug 20.

As is illustrated in FIGS. 2A–C, the bonding lug 20 may be connected to an electric motor 34 on the housing 38 of the motor 34 using a threaded fastener or screw 42. When properly installed, the conductor 14 is electrically coupled to the bonding lug 20 and the bonding lug 20 is electrically coupled to the housing 38. Generally an adequate electrical coupling is formed between the conductor 14 and the bonding lug 20. The electrical coupling may be formed via direct contact between the conductor 14 and the bonding lug 20 and/or via indirect contact through the screw 22. The screw 22 is formed of an electrically conductive material and when the screw 22 is tightened down on the conductor 14 an electrical coupling is formed between the conductor 14 and the screw 22. The screw 22 is electrically coupled to the bonding lug 20 through the interaction between the threads of the screw 22 and the corresponding threads in the aperture 28 of the bonding lug 20.

The contact between the bottom of the bonding lug 20 and the housing 38 may provide some degree of electrical coupling, however, the contacting surfaces of the bonding lug 20 and/or the housing 38 may include paint and/or other contamination that can diminish such electrical coupling. The paint and/or other contamination may additionally affect the degree of electrical coupling between the screw 42 and the bonding lug 20 as well as the direct contact between the conductor 14 and the bonding lug 20 discussed above.

The screw 42 is utilized to electrically couple the bonding lug 20 to the housing 38. Typically, the bonding lug 20 includes an aperture (not shown) through which the screw 42 passes and which is only a clearance aperture. Therefore, passing the screw 42 through the clearance aperture does not provide a reliable electrical coupling between the bonding lug 20 and the screw 42 (i.e., the threads of the screw 42 are not electrically coupled to the bonding lug 20 in a fashion similar to the way the threads of the screw 22 are electrically coupled to the corresponding threads of the aperture 40). If the screw 42 is not electrically coupled to the bonding lug 20 then the bonding lug 20 is likely not electrically coupled to the housing 38.

Accordingly, existing bonding lug apparatus (such as the bonding lug apparatus 10) utilize at least one star washer (not shown) (e.g., a star washer located around the screw 42 between the head 50 of the screw 42 and the bonding lug 20 and/or a star washer located around the screw 42 between the bonding lug 20 and the housing 38). Alternatively, or in addition, the screw 42 can have a serrated head to provide an electrical coupling between the screw 42 and the bonding lug 20 and therefore between the bonding lug 20 and the housing 38. The threads of the screw 42 generally become electrically coupled to the housing 38 when threaded into the housing 38, therefore, the coupling that generally presents a problem is the coupling between the screw 42 and the bonding lug 20. The star washer located between the head 50 and the bonding lug 20 and the serrated head are both designed to increase the reliability of the electrical coupling between the bonding lug 20 and the screw 42. The star washer located between the bonding lug 20 and the housing 38 is designed to increase the reliability of the electrical coupling between the bonding lug 20 and the housing 38. Use of the above techniques typically results in a proper installation.

While installing a motor 34 in a pool area (not shown) the efficiency of the installer is important. Currently, the amount of time it takes the installer to bond the motor 34 to the bonding grid (not shown) includes passing the conductor 14 through the aperture 18 and utilizing the above techniques to ensure all corresponding parts are electrically coupled as required. The installer may pass the entire length of the conductor 14 through the aperture 18 or the installer may cut the conductor 14, pass a portion of the conductor 14 through the aperture 18 and then reconnect the cut portions of the conductor 14 together to form a continuous electrically conductive path. Depending on the amount of time it takes to pass the conductor 14 through the aperture 18, reconnect the cut portions of the conductor 14, and/or perform extra electrical coupling steps, the bonding process may require unnecessary time and effort on the part of the installer.

SUMMARY OF THE INVENTION

The invention provides a bonding lug apparatus that allows the installer to quickly and efficiently bond devices such as an electric motor to a bonding grid of a pool area. The bonding lug apparatus is electrically coupled to a bonding conductor of the bonding grid simply by laying the bonding conductor on the bonding lug and tightening down a fastener such that the bonding conductor is captured between the bonding lug and the head of the fastener. The installer does not need to pass the bonding conductor through an aperture of the bonding lug and/or cut and reconnect portions of the bonding conductor to bond the motor to the conductor. The invention provides reliable electrical couplings without the use of star washers and/or threaded fasteners having serrated heads through the use of a self-tapping threaded fastener. The speed at which the installer can bond the motor to the bonding grid using the invention saves the installer time and money.

The invention provides an inexpensive bonding lug apparatus which may be retrofit on and/or an option of a motor utilized in a pool area. The bonding lug apparatus is only connected to the motor when the motor is intended for use in a pool area. Therefore, motors not intended for use in a pool area are less unsightly and do not include the added costs associated with the bonding lug apparatus.

The fastener preferrably has a hex head, which is more reliable in a corrosive environment, thereby saving the installer time when performing maintenance on the bonding lug apparatus.

More particularly, according to the method of the invention, a fastener having a head is inserted into an aperture of a bonding lug such that a bonding conductor is captured between the bonding lug and the head. The bonding lug is connected to a motor using the fastener and/or some other fastener. The bonding conductor is electrically coupled to the bonding lug via direct contact between the bonding conductor and the bonding lug and/or via indirect contact through the fastener. The bonding lug is electrically coupled to the motor via direct contact between the bonding lug and the motor, via indirect contact through the fastener and/or via indirect contact through the other fastener. Structure including at least a portion of the bonding lug, at least a portion of the motor and/or at least a portion of the other fastener, prevents the bonding conductor from moving out from under the head.

As is apparent from the above, it is an advantage of the invention to provide a new and improved bonding lug apparatus for an electric motor installed in a pool area. Other features and advantages of the invention will become apparent by consideration of the detailed description and accompanying drawings.

BRIEF DESCRIPTION OF THE DRAWINGS

FIG. 1B illustrates a prior art bonding lug apparatus electrically coupled to a bonding conductor.

FIGS. 2A–2C illustrate a prior art bonding lug apparatus connected to a representative electric motor.

FIGS. 3A–3C illustrate a bonding lug apparatus that is a first embodiment of the invention electrically coupled to a representative electric motor.

FIG. 4A illustrates the bonding lug apparatus that is the first embodiment of the invention.

FIG. 4B illustrates the bonding lug apparatus of FIG. 4A electrically coupled to a bonding conductor.

FIG. 4C illustrates the bonding lug apparatus of FIG. 4B electrically coupled to two bonding conductors.

FIG. 5A illustrates a bonding lug apparatus that is a second embodiment of the invention.

FIG. 6A illustrates a bonding lug apparatus that is a third embodiment of the invention.

FIG. 6B illustrates the bonding lug apparatus of FIG. 6A electrically coupled to a bonding conductor.

FIG. 7A illustrates a bonding lug apparatus that is a fourth embodiment of the invention.

FIG. 7B illustrates the bonding lug apparatus of FIG. 7A electrically coupled to a bonding conductor.

FIG. 8B illustrates the bonding lug apparatus of FIG. 8A electrically coupled to a bonding conductor.

FIG. 9A illustrates a bonding lug apparatus that is a sixth embodiment of the invention.

FIG. 9B illustrates the bonding lug apparatus of FIG. 9A electrically coupled to a bonding conductor.

DETAILED DESCRIPTION

Figure 1A:
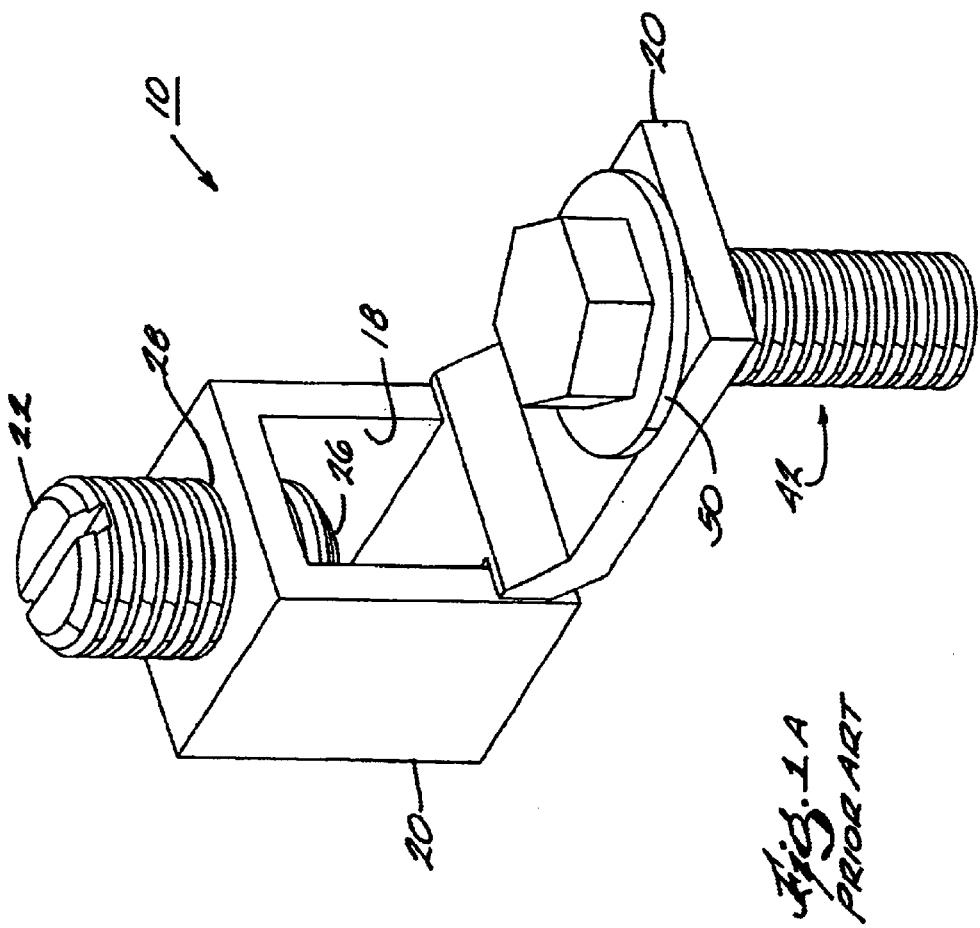
FIG. 1A illustrates a prior art bonding lug apparatus.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The use of "pool" and variations thereof herein is meant to encompass fluid-holding apparatus such as swimming pools, hot tubs, spas, and the like.

FIGS. 3A–C and 4A–D illustrate a bonding lug apparatus 100 that is a first embodiment of the invention electrically coupled to a representative electric motor 104. FIG. 3C illustrates an enlarged view of the breakaway section of FIG. 3A. It should be understood that the present invention is capable of use on other devices and the motor 104 is merely shown and described as an example of one such device. The illustrated motor 104 is drivingly connected to a pump (not shown) utilized to pump water into and/or out of a pool (not shown).

The apparatus 100 (see FIG. 4A) includes a fastener 108 having a head 112 and a shaft 116, and a bonding lug 120 having an aperture 124 that receives the fastener 108. The head 112 of the fastener 108 (and the heads of other fasteners having a head that are associated with the apparatus 100) may include any design (e.g., slotted, hex shaped, Phillips head, square head, round head, flat head, and the like). The head 112 may be designed such that an individual can quickly and conveniently install and/or maintain the apparatus 100. The head 112 preferably has a hex head, which is more reliable in a corrosive environment.

The shaft 116 of the fastener 108 (and the shafts other fasteners having shafts associated with the apparatus 100) may include any design (e.g., threaded, non-threaded, and the like). The shaft 116 may be removable connected to apertures corresponding to the shaft 116 or permanently connected to the apertures corresponding to the shaft 116. The shaft 116 preferably includes self-tapping threads such that a reliable electrical coupling is formed between the fastener 108 and each of the apertures receiving the shaft 116.

The bonding lug 120 is typically made of a copper or a copper alloy material. The aperture 124 of the bonding lug 120 (and the apertures corresponding to the shafts of the fasteners having shafts associated with the apparatus 100) may be sized to frictionally engage the shaft 116, threaded to receive the threads of the shaft 116, sized such that threads are produced in the aperture when the shaft 116 (including self-tapping threads) is received by the aperture, or otherwise sized to receive the shaft 116 (e.g., clearance aperture).

A bonding conductor 132 is captured between the head 112 and the bonding lug 120 when the fastener 108 is received in the aperture 124. The conductor 132 is typically a solid eight gauge (or larger) bare wire. The conductor 132 is generally captured between the head 112 and the bonding lug 120 without wrapping the conductor 132 around the fastener 108. Capturing the conductor 132 between the head 112 and the bonding lug 120 does not necessitate the conductor 132 be captured directly between the head 112 and the bonding lug 120. Other materials (e.g., electrically conductive materials) may be captured between the conductor 132 and the head 112 and/or the conductor 132 and the bonding lug 120 without interfering with the design of the invention (e.g., see discussion below with respect to FIGS. 5A and 5B).

A structure (discussed further below) is provided that prevents the conductor 132 from moving out from under the head 112. The structure may be included on any number of the bonding lug 120, the motor 104, fasteners associated with the apparatus 100, and the like. The structure may include any number of sub-structures. More than one structure may be provided if more than one bonding conductor is electrically coupled to the apparatus 100.

As best illustrated in FIG. 3C, the apparatus 100 includes a fastener 136. The bonding lug 120 is connected to the housing 140 of the motor 104 (i.e., to the motor 140) with the fastener 136. The housing 140 may include a sheet metal main frame of the motor 104, a sheet metal base of the motor 104, a first aluminum end frame of the motor 104, a second aluminum end frame of the motor 104, and the like. The fastener 136 preferably connects the bonding lug 120 to the housing 140 in a fashion such that the bonding lug 120 is electrically coupled to the housing 140. The fastener 136 (and other fasteners associated with the apparatus 100) may include a weld, a threaded fastener, a non-threaded fastener, an electrically conductive adhesive, a non-electrically conductive adhesive (preferably utilized in conjunction with a conductor that electrically couples the bonding lug 120 and the housing 140), and the like.

In the illustrated embodiments of the invention the bonding lug 120 is connected to the housing 140 with the fastener 108. In other embodiments the fastener 108 may not be utilized to connect the bonding lug 120 to the housing 140 (e.g., the fastener 108 may terminate in the aperture 124 of the bonding lug 120). If the fastener 108 is not utilized to connect the bonding lug 120 to the housing 140 then the aperture 124 is preferably designed such that the interaction between the shaft 116 and the aperture 124 provides a reliable electrical coupling between the bonding lug 120 and the conductor 132 (i.e., via indirect contact through the fastener 108). In other embodiments the interaction between the shaft 116 and the aperture 124 may not provide a reliable electrical coupling between the bonding lug 120 and the conductor 132 if a direct contact between the bonding lug 120 and the conductor 132 provides a reliable electrical coupling.

Generally, when the fastener 136 and the fastener 108 are utilized to connect the bonding lug 120 to the housing 140 the bonding lug 120 is prevented from rotating on the housing 140. If only a single fastener (e.g., the fastener 136) is utilized to connect the bonding lug 120 to the housing 140, the housing 138 may include a structure (e.g., see discussion below with respect to FIG. 10A) that prevents rotation of the bonding lug 120 on the housing 140.

Figure 4D:
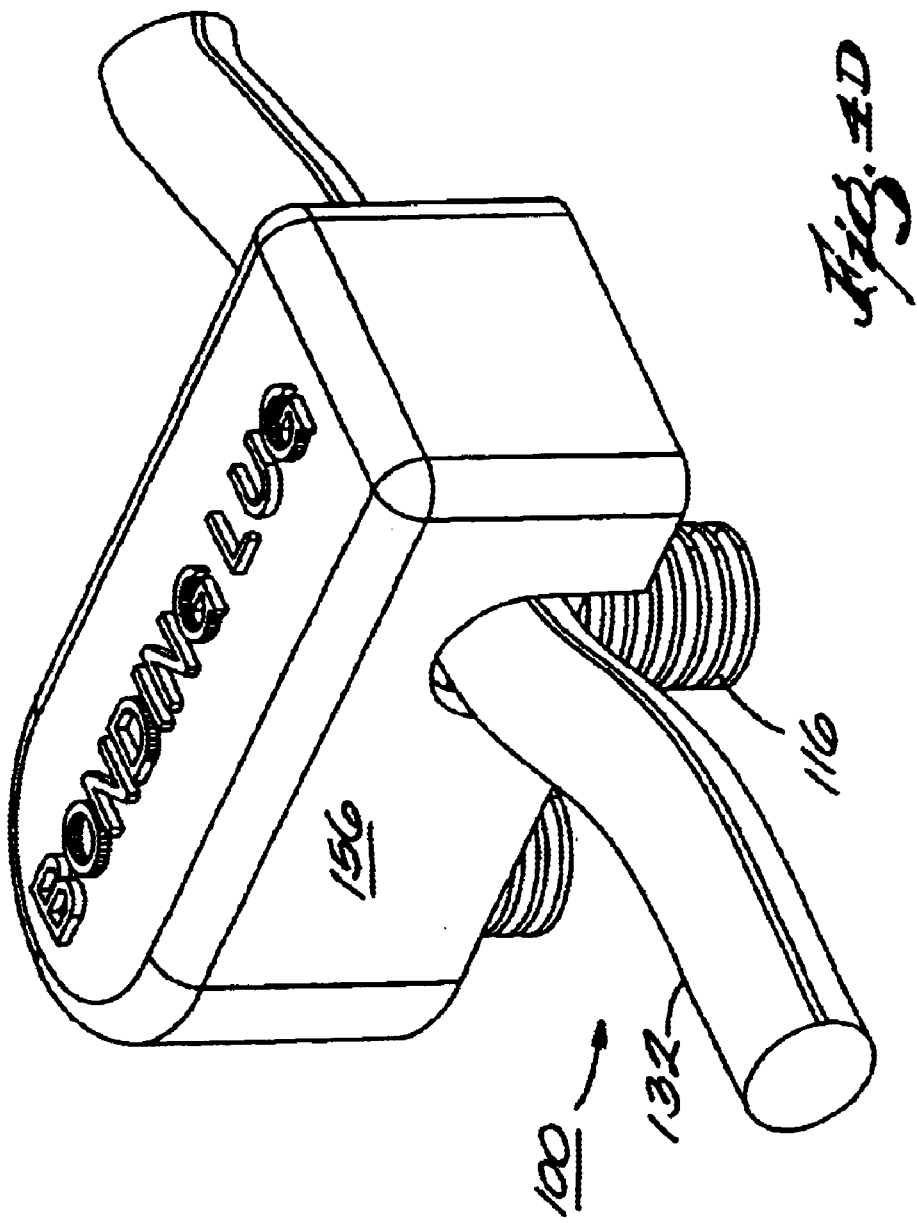
FIG. 4D illustrates the bonding lug apparatus of FIG. 4A electrically coupled to a bonding conductor and connected to a bonding lug apparatus cover.

The bonding lug 120 illustrated in FIGS. 4-C includes a pair of spaced tabs 120a and 120b formed and extending upwardly (in FIGS. 4A, 4B and 4C) in the direction of the head 112. The illustrated tabs 120a and 120b are formed normal to the primary plane of the bonding lug 120. Each tab 120a and 120b includes a surface 140 of a half-round cutout and a surface 144 of a quarter-round cutout. The surfaces 140 of the half-round cutouts act as the structure that prevents the conductor 132 from moving out from under the head 112. The surfaces 144 of the quarter-round cutouts in conjunction with a head 148 of the fastener 136 act as a second structure (similar to the structure) that prevents a second bonding conductor 132 from moving out from under the head 112. FIG. 4B illustrates the apparatus 100 electrically coupled to the conductor 132. FIG. 4C illustrates the apparatus 100 electrically coupled to the conductor 132 and a second bonding conductor 152 (i.e., the apparatus 100 acts to splice the conductor 132 and the conductor 152 together). The apparatus may be electrically coupled to the conductor 132 and/or the conductor 152. FIG. 4D illustrates the apparatus 100 electrically coupled to the conductor 132 with a bonding lug apparatus cover 156 connected to the apparatus 100. The cover 156 can be utilized to protect the apparatus 100 from environmental conditions and protect humans and animals from the surfaces of the apparatus 100. The cover 156 may employ other shapes and sizes in other embodiments. The shape and size employed may depend on the number of bonding conductors the apparatus 100 is electrically coupled to and the shape of the apparatus 100. The cover 156 may include alphanumeric characters, as illustrated in FIG. 4D, such as "BONDING LUG" to assist an individual in identifying the apparatus 100.

Figure 5B:
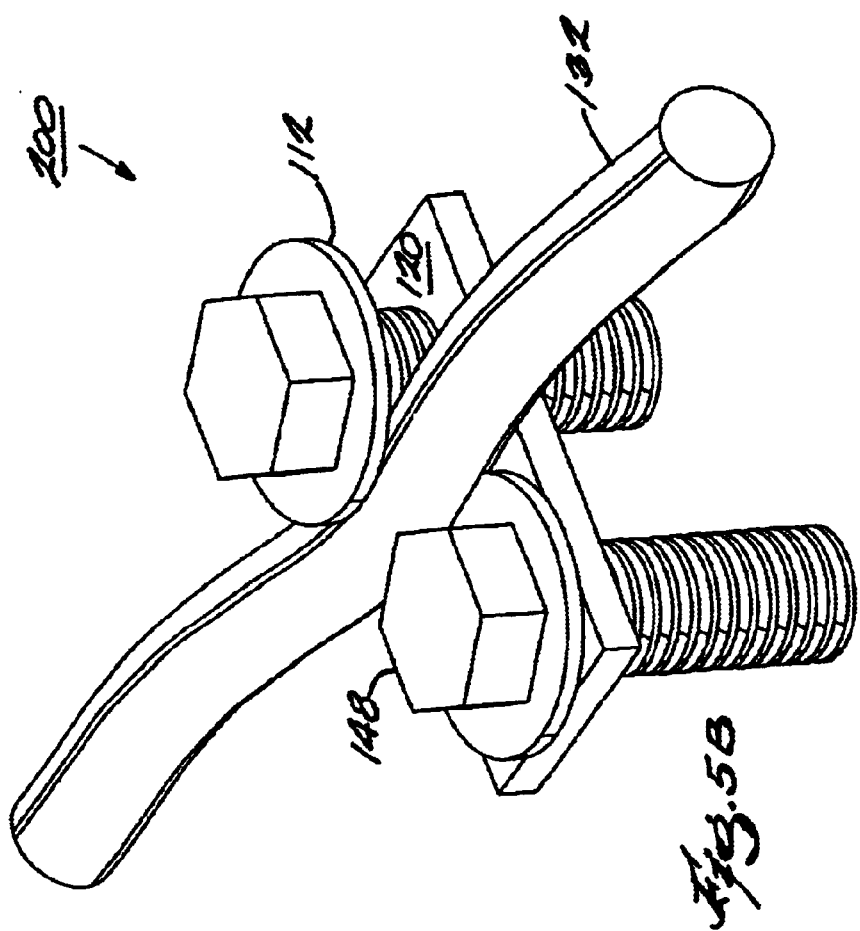
FIG. 5B illustrates the bonding lug apparatus of FIG. 5A electrically coupled to a bonding conductor.

FIGS. 5A and 5B illustrate a bonding lug apparatus 200 that is a second embodiment of the invention. Elements in common with the apparatus 100 have the same reference numerals. The head 148 is configured to act as the structure that prevents the conductor 132 from moving out from under the head 112. FIG. 5B illustrates the apparatus 200 electrically coupled to the conductor 132. As is illustrated, the conductor 132 does not necessarily need to be captured directly between the head 112 and the bonding lug 120. The apparatus 200 captures the conductor 132 between the bottom side of the head 112 and the top side of the flange portion of the head 148. A portion of the conductor 132 may or may not directly contact the bonding lug 120. If a portion of the conductor 132 does not directly contact the bonding lug 120 the conductor 132 can be electrically coupled to the bonding lug 120 via indirect contact (i.e., through the fastener 108 and/or the fastener 136). In other embodiments the conductor 132 can be electrically coupled to the bonding lug 120 through a conductor (not shown) that is electrically coupled to the conductor 132 and electrically coupled to the bonding lug 120.

FIGS. 6A and 6B illustrate a bonding lug apparatus 300 that is a third embodiment of the invention. Elements in common with the apparatus 100 have the same reference numerals. The bonding lug 120 includes a pair of spaced tabs 120c and 120d formed and extending upwardly (in FIGS. 6A and 6B) in the direction of the head 112. The illustrated tabs 120c and 120d are formed normal to the primary plane of the bonding lug 120 and only extend along a portion of the length of the bonding lug 120. A surface 160 of each tab 120c and 120d act as the structure that prevents the conductor 132 from moving out from under the head 112. The head 148 may act as the second structure (discussed above) if the spacing between the head 148 and the shaft 116 is substantially similar to the diameter of the conductor 152 (i.e., the outside diameter of the conductor 152 rests against the head 148 when captured between the head 112 and the bonding lug 120). FIG. 6B illustrates the apparatus 300 electrically coupled to the conductor 132. As discussed above, the apparatus 300 may be electrically coupled to the conductor 132 and/or the conductor 152.

FIGS. 7A and 7B illustrate a bonding lug apparatus 400 that is a fourth embodiment of the invention. Elements in common with the apparatus 100 have the same reference numerals. The bonding lug 120 includes an arched tab 120e formed and extending upwardly (in FIGS. 7A and 7B) in the direction of the head 112. The illustrated tab 120e is formed such that an arched surface 164 of the tab 120e is normal to the primary plane of the bonding lug 120. The arched surface 164 acts as the structure that prevents the conductor 132 from moving out from under the head 112. The head 148 may act as the second structure (discussed above) if the spacing between the head 148 and the shaft 116 is substantially similar to the diameter of the conductor 152. FIG. 7B illustrates the apparatus 400 electrically coupled to the conductor 132. As discussed above, the apparatus 400 may be electrically coupled to the conductor 132 and/or the conductor 152.

Figure 8A:
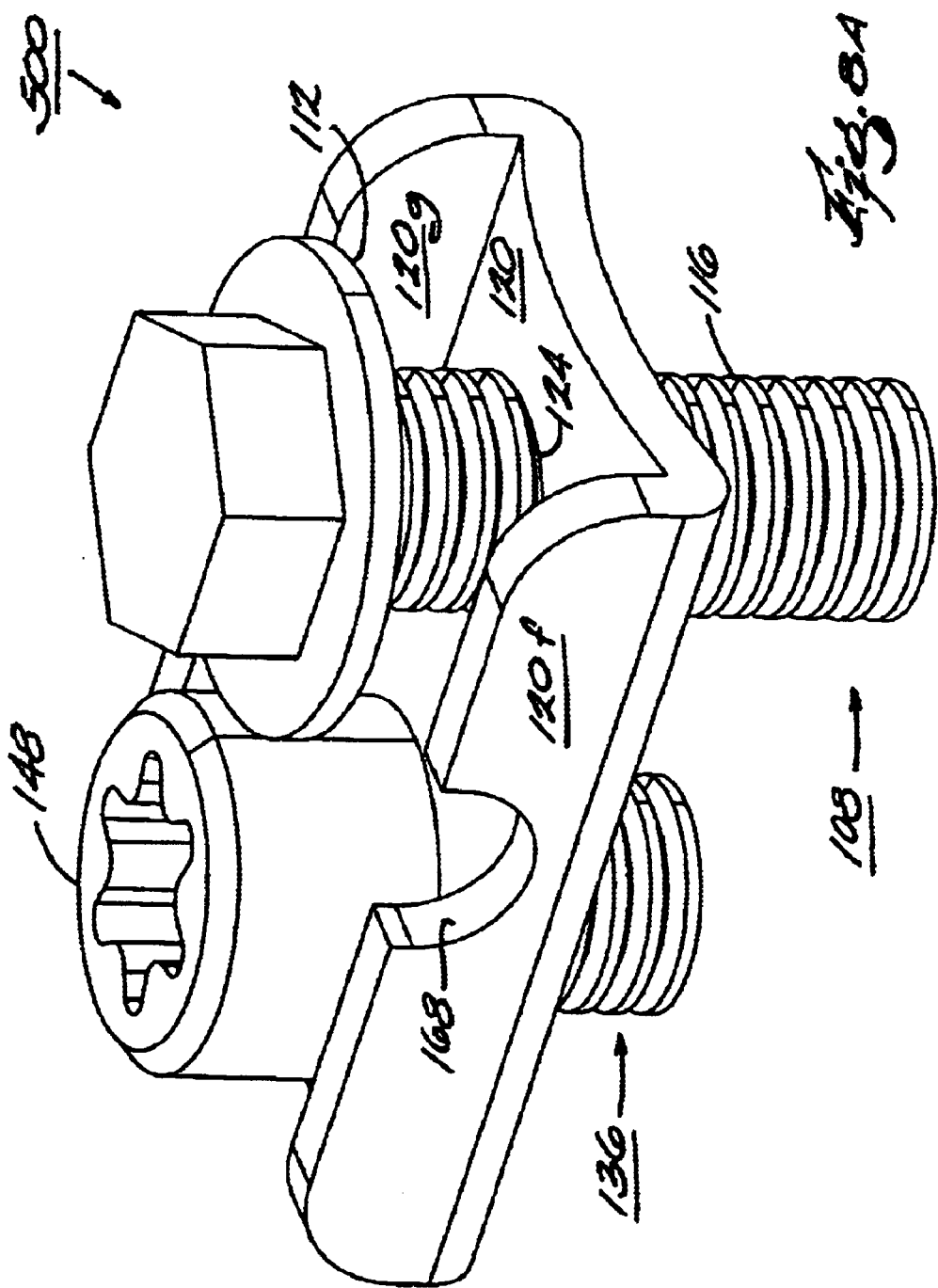
FIG. 8A illustrates a bonding lug apparatus that is a fifth embodiment of the invention.

FIGS. 8A and 8B illustrate a bonding lug apparatus 500 that is a fifth embodiment of the invention. Elements in common with the apparatus 100 have the same reference numerals. The bonding lug 120 includes a pair of spaced tabs 120f and 120g formed and extending upwardly (in FIGS. 8A and 8B) in the direction of the head 112. The illustrated tabs 120f and 120g are formed normal to the primary plane of the bonding lug 120. Each tab includes a half-round cutout 168. The half-round cutouts 168 act as the structure that prevents the conductor 132 from moving out from under the head 112. The head 148 of the fastener 136 may act in conjunction with the half-round cutouts 168 if the spacing between the head 148 and the shaft 116 is substantially similar to the diameter of the conductor 152. FIG. 8B illustrates the apparatus 500 electrically coupled to the conductor 132.

FIGS. 9A and 9B illustrate a bonding lug apparatus 600 that is a sixth embodiment of the invention. Elements in common with the apparatus 100 have the same reference numerals. The bonding lug 120 includes a tab 120h formed and extending upwardly in the direction of the head and angularly away from the axis of the fastener 108 (in FIGS. 9A and 9B). The illustrated tab 120h is formed such that a surface 172 of the tab 120h acts as the structure that prevents the conductor 132 from moving out from under the head 112. The surface 172 may include a portion 176 that is angled with respect to the surface 172 to further prevent the conductor 132 from moving out from under the head 112. The tab 120h may include ribs 178 to increase the rigidity of the tab 120h. The head 148 of the fastener 136 may act as the second structure (discussed above) if the spacing between the head 148 and the shaft 116 is substantially similar to the diameter of the conductor 152. FIG. 9B illustrates the apparatus 600 electrically coupled to the conductor 132. As discussed above, the apparatus 600 may be electrically coupled to the conductor 132 and/or the conductor 152.

Figure 10A:
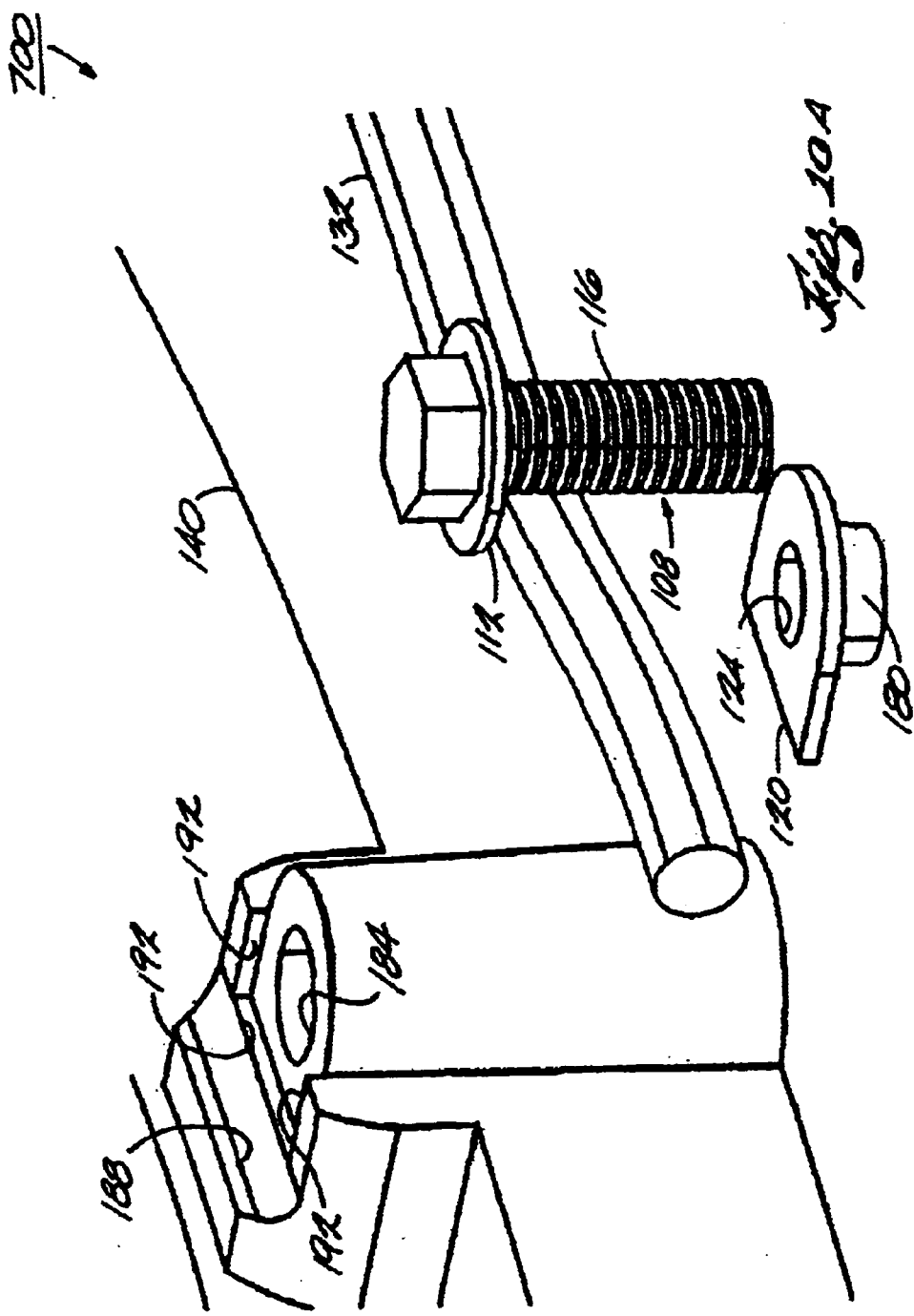
FIG. 10A illustrates a bonding lug apparatus that is a seventh embodiment of the invention.
Figure 10B:
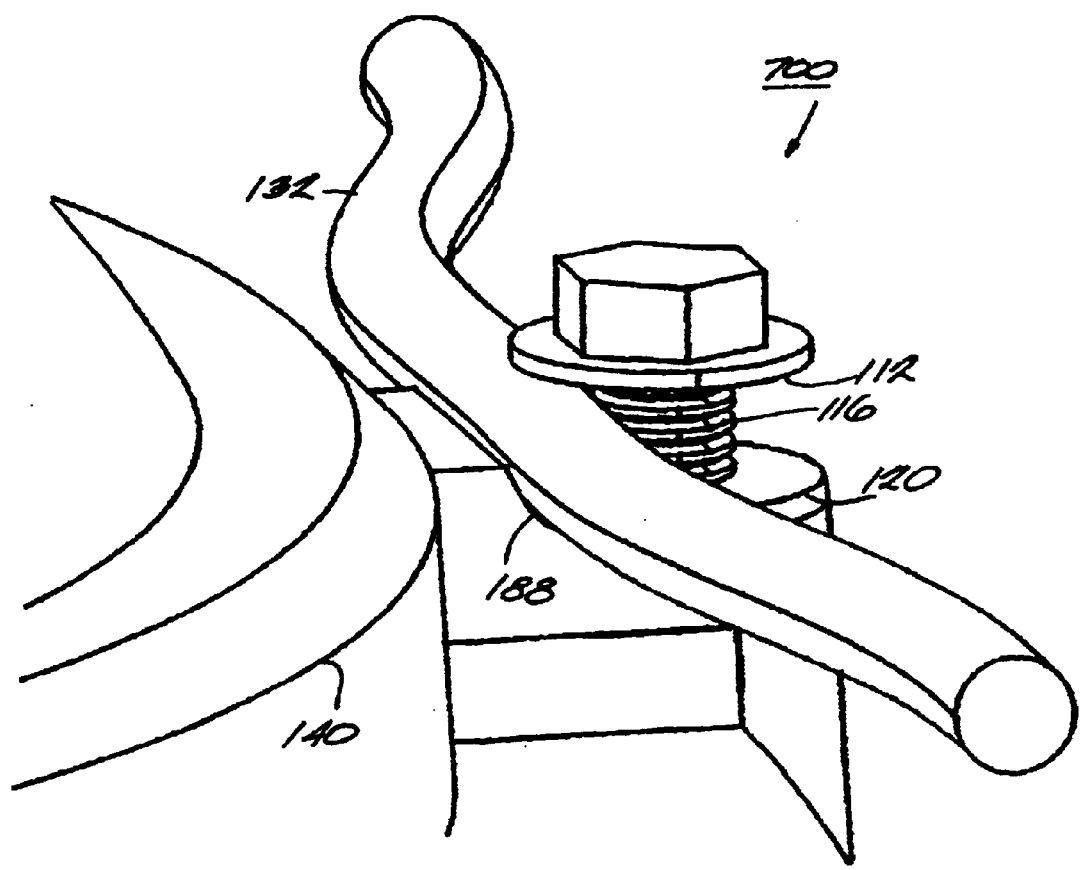
FIG. 10B illustrates the bonding lug apparatus of FIG. 10A electrically coupled to a bonding conductor.

FIGS. 10A and 10B illustrate a bonding lug apparatus 700 that is a seventh embodiment of the invention. Elements in common with the apparatus 100 have the same reference numerals. The bonding lug 120 includes a protrusion 180. The protrusion 180 generally provides a more reliable electrical coupling between the bonding lug 120 and the housing 140 because the amount of direct contact surface area is increased. An aperture 184 on the housing 140 includes a portion that frictionally receives the protrusion 180 to form the direct contact and a portion that receives the shaft 116.

The housing 140 includes a stepped portion 188 that acts as the structure that prevents the conductor 132 from moving out from under the head 112. The housing 140 also includes surfaces 192 that act as the structure discussed above that prevents rotation of the bonding lug 120 on the housing 140.

Thus, the invention provides, among other things, a bonding lug apparatus for an electric motor installed in a pool area. Various features and advantages of the invention are set forth in the following claims.

What is claimed is:

1. A method of bonding a device in a bonding area to other conductive material in the bonding area, the device including an electrically conductive portion, the method comprising:

providing a bonding conductor;

providing a bonding lug including an aperture;

providing a first fastener including a shaft and a head wider than the shaft so as to define a shoulder extending outwardly from the shaft;

inserting the first fastener into the aperture in the bonding lug so as to capture the bonding conductor between the shoulder and the bonding lug, without wrapping the bonding conductor around the first fastener and without having to pass the bonding conductor through a fully enclosed aperture of the bonding lug, such that the bonding conductor is electrically coupled to the bonding lug;

providing a structure that prevents the bonding conductor from moving out from under the shoulder of the first fastener;

electrically coupling the bonding lug to the electrically conductive portion of the device in the bonding are;

electrically coupling the bonding conductor to the other conductive material in the bonding area; and providing a second fastener, wherein the structure that prevents the bonding conductor from moving out from under the shoulder of the first fastener includes a portion of the second fastener.

2. A method as claimed in claim 1, wherein the structure that prevents the bonding conductor from moving out from under the shoulder of the first fastener includes a portion of the bonding lug.

3. A method as claimed in claim 2, wherein the bonding lug includes a base portion and a pair of spaced tabs extending from the base portion, each tab having a surface of a cutout, wherein each cutout is sized to receive a portion of the bonding conductor, and wherein the portion of the boiling lug includes the surface of each cutout.

4. A method as claimed in claim 2, wherein the bonding lug includes a base portion and tab extending from the base portion, the tab having a surface, and wherein the portion of the bonding lug includes the surface of the tab.

5. A method as claimed in claim 1, wherein the second fastener includes a second head, and wherein the portion of the second fastener includes the second head.

6. A method as claimed in claim 1, wherein the bonding lug is in direct contact with the electrically conductive portion of the device.

7. A method as claimed in claim 1, wherein the bonding lug is electrically coupled to the electrically conductive portion of the device via an indirect contact through at least one of the first fastener and the second fastener.

8. A method as claimed in claim 1, wherein the head is a hex head.

9. A method as claimed in claim 1, wherein the device is a motor.

10. A method as claimed in claim 1, wherein the bonding area is a pool area.

11. A method of bonding a motor in a pool area to other conductive material in the pool area, the motor including an electrically conductive portion, the method comprising:

providing a first bonding conductor;

providing a bonding lug including an aperture;

providing a first fastener including a shaft and a head wider than die shaft so as to define a she alder extending outwardly from the shaft;

inserting the first fastener into the aperture in the bonding lug so as to capture the first bonding conductor between the shoulder and the bonding lug, without wrapping the first bonding conductor around the first fastener and without having to pass the first bonding conductor through a fully enclosed aperture of the bonding lug, such that the first bonding conductor is electrically coupled to the bonding lug;

providing a second fastener;

directly connecting the bonding lug to the electrically conductive portion of the motor with the second fastener;

electrically coupling the bonding lug to the electrically conductive portion of the motor in the pool area;

electrically coupling the first bonding conductor to the other conductive material in the pool area;

providing a structure that prevents the first bonding conductor from moving out from under the shoulder of the fastener, wherein the structure that prevents the first bonding conductor from moving out from under the shoulder of the fastener includes a portion of the bonding lug;

providing a second bonding conductor;

inserting the first fastener into the aperture in the bonding lug so as to capture the second bonding conductor between the shoulder and the bonding lug, without wrapping the second bonding conductor around the first fastener and without having to pass the second bonding conductor through a filly enclosed aperture of the bonding lug, such that the second bonding conductor is electrically coupled to the bonding lug;

electrically coupling the second bonding conductor to the other conductive materials in the pool area; and providing a second structure that prevents the second bonding conductor from moving out from under the shoulder of the first fastener, wherein the structure includes a portion of the second fastener.

12. A method as claimed in claim 11, wherein the bonding lug includes a base portion and a tab extending from the base portion, the tab having a surface, wherein the portion of the bonding lug includes the surface of the tab.

13. A method as claimed in claim 11, wherein the bonding lug is electrically coupled to the electrically conductive portion of the motor via an indirect contact through the first fastener.

14. A method as claimed in claim 11, wherein the head is rotatable with a tool.

15. A method as claimed in claim 14, wherein the head includes a hex head.

16. A method as claimed in claim 11, wherein the first fastener includes self-tapping threads, and wherein the aperture is sized such that corresponding threads are produced in the aperture when the first fastener is received by the aperture.

17. A method as claimed in claim 11, and further comprising:

providing a bonding lug apparatus cover adapted to cover a portion of the bonding lug, the first fastener and the second fastener; and connecting the bonding lug apparatus cover to at least one of the bonding lug, the first fastener and the second fastener.

18. A method as claimed in claim 1, wherein the second fastener includes a second head, wherein the portion of the fastener includes the second head.

19. A method of bonding a device in a bonding area to other conductive material in the bonding area, the device including an electrically conductive portion, the method comprising:

providing a bonding conductor;

providing a bonding lug including a base portion, a first aperture positioned in the base portion, a second aperture positioned in the base portion, and a tab extending from the base portion, the tab having a surface;

providing a first threaded fastener including a shaft and a head wider than the shaft so as to define a shoulder extending outwardly from the shaft;

providing a second threaded fastener;

inserting the second threaded fastener into the second aperture in the bonding lug and threading the second threaded fastener into the electrically conductive portion of the device such that the bonding lug is electrically coupled to the electrically conductive portion of the device;

inserting the first threaded fastener into the first aperture in the bonding lug and threading the first threaded fastener into the electrically conductive portion of the device so as to capture the bonding conductor between the shoulder and the bonding lug, without wrapping the bonding conductor around the first threaded fastener and without having to pass the bonding conductor through a fully enclosed aperture of the bonding lug, such that the bonding conductor is electrically coupled to the bonding lug;

electrically coupling the bonding conductor to the other conducive material in the bonding area; and providing a structure that prevents the bonding conductor from moving out from under the shoulder of the first threaded fastener, wherein the structure that prevents the bonding conductor from moving out from under the shoulder of the first threaded fastener includes the surface of the tab.

20. A method as claimed in claim 19, wherein the tab extending from the base portion includes an arched tab extending from the base portion, the arched tab having an arched surface, and wherein the the surface of the tab includes the arched surface of the arched tab.

21. A method as claimed in claim 19, wherein the surface of the tab is substantially skew to an axis of rotation of the shaft of the first threaded fastener when the bonding conductor is captured between the shoulder and the bonding lug.

22. A method as claimed in claim 19, wherein the structure that prevents the bonding conductor from moving out from under the shoulder of the first threaded fastener includes a portion of the device.

23. A method as claimed in claim 22, wherein the device includes a housing having a stepped portion, and wherein the portion of the device includes the stepped portion.

24. A method as claimed in claim 19, and further comprising:

providing a second bonding conductor;

inserting the first threaded fastener into the first aperture in the bonding lug and threading the first threaded fastener into the electrically conductive portion of the device so as to capture the second bonding conductor between the shoulder and the second bonding lug, without wrapping the second bonding conductor around the first threaded fastener and without having to pass the second bonding conductor through a fully enclosed aperture of the bonding lug, such that the second bonding conductor is electrically coupled to the bonding lug;

electrically coupling the second bonding conductor to the other conductive material in the bonding area; and providing a second structure that prevents the second bonding conductor from moving out from under the shoulder of the first threaded fastener, wherein the second structure includes a portion of the second threaded fastener, wherein the second threaded fastener includes a second head, wherein the portion of the second threaded fastener includes the second head.

25. A method as claimed in claim 19, wherein the bonding area is a pool area.

26. A method as claimed in claim 19, wherein the device is a motor.

27. A method claimed in claim 9, the step of inserting the second threaded fastener into the second aperture includes inserting the second threaded fastener into the second aperture in the bonding lug and threading the second threaded fastener into the electrically conductive portion of the device such that the bonding lug is in direct contact with the electrically conductive portion of the motor.

28. A method as claimed in claim 19, the tab extending from the base portion includes a pair of spaced tabs extending from the base portion, each tab having a surface of a cutout, wherein each cutout is sized to receive a portion of the bonding conductor, and wherein the surface of the tab includes the surface of each cutout.

* * * * *

UNITED STATES PATENT AND TRADEMARK OFFICE
CERTIFICATE OF CORRECTION

PATENT NO. : 6,725,524 B2
DATED : April 27, 2004
INVENTOR(S) : Chih M. Lin

It is certified that error appears in the above-identified patent and that said Letters Patent is hereby corrected as shown below:

Column 9,
Line 18, "boiling" should be -- bonding --.
Line 20, insert -- a -- before "tab"
Line 45, "die" should be -- the --
Line 45, "she alder" shoulde be -- shoulder --

Column 10,
Line 10, "filly" should be -- fully --

Column 12,
Line 23, insert -- where -- before the first occurrence of "the"
Line 30, insert -- wherein -- before "the"

Signed and Sealed this

Fourteenth Day of December, 2004

JON W. DUDAS
*Director of the United States Patent and Trademark Office*